Patented May 20, 1941

2,242,373

UNITED STATES PATENT OFFICE 2,242,373

PROCESS FOR PRODUCING POROUS CELLULOSE DERIVATIVES HAVING AN INCREASED RATE OF SOLUBILITY

George Schneider, Montclair, N. J., assignor to Celanese Corporation of America, a corporation of Delaware No Drawing. Application August 24, 1938, Serial No. 226,588

8 Claims. (Cl. 260—230)

This invention relates to the treatment of derivatives of cellulose, and relates more particularly to the treatment of derivatives of cellulose to improve their solubility characteristics. This invention is a continuation-in-part of the invention described in my copending application S. No. 221,361 filed July 26, 1938.

It is an object of this invention to provide a novel method for the expeditious and economic production of derivatives of cellulose which dissolve very rapidly in solvents therefor. Other objects of this invention will appear from the following detailed description and the appended claims.

In the usual method employed in the manufacture of cellulose acetate the product, on completion of the acetylation process, is obtained in solution in acetic acid or other suitable solvent, and in order to separate the cellulose acetate the solution is mixed with a precipitating agent, for example, water or dilute acetic acid. Cellulose acetate produced in this manner, because the physical characteristics of the precipitated cellulose acetate depends to a great extent upon the conditions under which precipitation is effected, is not always satisfactory. This is particularly true when the cellulose acetate is subsequently to be redissolved as is necessary, for example, in the manufacture of artificial filaments and similar articles. I have found when dissolving such cellulose acetate in solvents therefor that not only is the rate of solution often quite slow, but also that gels containing unwetted cellulose acetate in the center are frequently formed.

In accordance with my invention I produce derivatives of cellulose which dissolve very rapidly in solvents therefor and which in solution form no gels. Such derivatives of cellulose are produced by dissolving cellulose derivatives, under the action of heat and pressure, in a liquid comprising a highly volatile substance which is a solvent for the derivatives of celluolse and a substance which at normal temperatures and pressures, and especially in the absence of volatile substance, is not a solvent for the derivative of celluoise but is preferably a precipitating liquid. The liquid as initially added to the derivative of cellulose is preferably not a solvent for said derivative of cellulose. The derivative of cellulose is dissolved in the liquid under the action of heat and pressure, the pressure being then quickly released so as to cause the volatile liquid to volatilize and expand thus forming pockets, holes, ducts, and like openings in the derivatives of cellulose.

While this invention is applicable to the production of porous material from any derivative of cellulose such as organic esters of cellulose, for example, cellulose formate, cellulose acetate, cellulose propionate and cellulose butyrate, and cellulose ethers, for example, methyl cellulose, ethyl cellulose and benzyl cellulose, the invention will be described with particular reference to cellulose acetate.

As stated, the liquid employed for dissolving the cellulose derivative is one containing a highly volatile solvent for the derivative of cellulose and precipitating liquid. Preferably, the liquid contains 60 parts by weight of water and 40 parts by weight of acetone where cellulose acetate is the derivative of cellulose employed. This liquid normally has little or no effect on cellulose acetate, but under a pressure of about 75 pounds per square inch and a temperature of 65° C. the cellulose acetate may be dissolved therein. To make the cellulose acetate highly porous the pressure on the solution is quickly released while to make the material less porous the pressure is released more slowly. The production of porous cellulose acetate may be accomplished by placing the desired quantity of cellulose and liquid in an autoclave and raising the temperature and pressure to the desired stages by air pressure pumped to the autoclave at a position above the material. Upon quickly releasing the air pressure the material in solution is precipittaed, expands and puffs up to a porous mass.

Another method of producing the porous material is to place the cellulose acetate and the liquid in the bottom of a cylinder having a piston therein and provided with a means for heating the contents of the cylinder. Suitable pressure is obtained by forcing the piston towards the solution and release of pressure is effected by withdrawal of the piston.

The preferred method, however, of forming the porous cellulose acetate is to place the cellulose acetate and liquid in a container having a valve at the bottom and an air line at the top thereof, and provided with means for heating the said container. In order to effect the solution of the cellulose acetate the container is heated and air is supplied through the top of the container to build up the desired pressure on the material. Then, while maintaining the pressure on the material constant, the valve at the bottom is opened allowing the material to be extruded into the atmosphere, or into a receptacle at sub-atmospheric pressure, in which case there is almost an instantaneous release of pressure and a very fluffy porous mass of cellulose acetate is produced.

As stated above, the liquid in which the cellulose acetate is dissolved by the aid of heat and pressure may be any liquid mixture containing a volatile solvent and a precipitating liquid, preferably a mixture of acetone and water. Other solvents or solvent mixtures may be employed, however, such as for example, chloroform, mixtures of acetone and methyl and ethyl alcohol, ethylene dichloride, mixtures of ethylene dichloride and ethyl or methyl alcohol, etc. The precipitating liquid for cellulose acetate is, for economic reasons, preferably water. However, other precipitating liquids may be employed such as kerosene, and other like hydrocarbons, naphtha, etc. Obviously the concentration of the solvent in the precipitating liquid will depend upon the solubility characteristics of the cellulose derivative employed in the particular solvents used. The concentration of the solvent in the liquid should be below that which has an active solvent action on the cellulose derivative at normal temperature and atmospheric pressure. In any case, the liquid mixture should not have more than a softening or swelling action on the cellulose derivative at room temperature and atmospheric pressure.

Prior to fusion or solution under heat and pressure, the cellulose derivative may be soaked in an excess of the solvent/precipitant mixture to induce swelling. The material, however, should be fairly well drained prior to its being placed in the container where fusion is to take place as with higher ratios of liquid to cellulose derivatives fusion is slower and the resulting product is less porous.

When forming porous material of cellulose acetate employing a water/acetone mixture, I have found the minimum pressure for fusion to be between 60 and 70 pounds per square inch. A higher pressure, e. g. 100 pounds per square inch, effects a more complete fusion and results in a material having greater porosity. The minimum time of fusion is about one hour. I have found that the liquid giving the best results contains from 35 to 45% of acetone and from 65 to 55% of water. Where the liquid contains less than 35% of acetone, fusion is difficult, while with an acetone content above 45% the products obtained are more dense i. e. of diminished porosity.

As an illustration of a method of forming porous cellulose acetate the following example is given, it being understood, however, that the invention is not limited thereto:

100 parts of cellulose acetate having an acetyl value of about 54.5° are soaked in a mixture of 35 parts of acetone and 65 parts of water until the cellulose acetate is slightly swollen. The liquid is then drained from the cellulose acetate until about 275 parts of liquid remain on the 100 parts of cellulose acetate. The materials are then subjected to a pressure of about 95 pounds per square inch at a temperature of about 75° C. for three hours. The pressure is then quickly released, producing a puffed-up mass of cellulose acetate having a texture of coarse natural sponge.

The fused porous cellulose acetate is then washed, dried and ground.

I found that this ground material, particularly when it has a flaky form, dissolves in solvents at a more rapid rate than the cellulose acetate from which it was produced dissolved in the same solvents. I found, moreover, that if the cellulose acetate particles are screened and only those particles of from 4 to 30 mesh are retained, such particles have an even higher increased rate of solution in solvents therefor. Particles of from 1 to 4 mesh and above 30 mesh dissolved much more slowly in solvents therefor than the particles of from 4 to 30 mesh.

It is to be understood that the foregoing detailed description is merely given by way of illustration and that many variations may be made therein without departing from the spirit of my invention.

Having described my invention, what I desire to secure by Letters Patent is:

1. Process for the production of derivatives of cellulose having an increased rate of solution in solvents therefor, which comprises dissolving a derivative of cellulose selected from the group consisting of the lower fatty acid esters of cellulose and cellulose ethers with the aid of heat and pressure in a liquid containing an active solvent in a proportion of 35 to 45% and a precipitating liquid in a proportion of 65 to 55%, quickly releasing the pressure to form a porous mass and then grinding the porous derivative of cellulose into particle size.

2. Process for the production of cellulose acetate having an increased rate of solution in solvents therefor, which comprises dissolving cellulose acetate with the aid of heat and pressure in a liquid containing an active solvent in a proportion of 35 to 45% and a precipitating liquid in a proportion of 65 to 55%, quickly releasing the pressure to form a porous mass and then grinding the porous cellulose acetate into particle size.

3. Process for the production of cellulose acetate having an increased rate of solution in solvents therefor, which comprises dissolving cellulose acetate with the aid of heat and pressure in a liquid containing from 35 to 45% of acetone and from 65 to 55% of water, quickly releasing the pressure to form a porous mass and then grinding the porous cellulose acetate into particle size.

4. Process for the production of derivatives of cellulose having an increased rate of solution in solvents therefor, which comprises dissolving a derivative of cellulose selected from the group consisting of the lower fatty acid esters of cellulose and cellulose ethers with the aid of heat and pressure in a liquid containing an active solvent in a proportion of 35 to 45% and a precipitating liquid in a proportion of 65 to 55%, quickly releasing the pressure to form a porous mass and then grinding the porous derivative of cellulose into the form of flaky particles.

5. Process for the production of cellulose acetate having an increased rate of solution in solvents therefor, which comprises dissolving cellulose acetate with the aid of heat and pressure in a liquid containing an active solvent in a proportion of 35 to 45% and a precipitating liquid in a proportion of 65 to 55%, quickly releasing the pressure to form a porous mass and then grinding the porous cellulose acetate into the form of flaky particles.

6. Process for the production of derivatives of cellulose having an increased rate of solution in solvents therefor, which comprises dissolving a derivative of cellulose selected from the group consisting of the lower fatty acid esters of cellulose and cellulose ethers by subjecting the same to heat and a pressure of above 60 pounds per square inch and to the action of a liquid containing an active solvent in a proportion of 35 to 45% and a precipitating liquid in a proportion of 65 to 55%, quickly releasing the pressure to form a porous mass and then grinding the porous derivative of cellulose into particle size.

7. Process for the production of cellulose acetate having an increased rate of solution in solvents therefor, which comprises dissolving cellulose acetate by subjecting the same to heat and a pressure of above 60 pounds per square inch and to the action of a liquid containing an active solvent in a proportion of 35 to 45% and a precipitating liquid in a proportion of 65 to 55%, quickly releasing the pressure to form a porous mass and then grinding the porous cellulose acetate into particle size.

8. Process for the production of cellulose acetate having an increased rate of solution in solvents therefor, which comprises dissolving cellulose acetate by subjecting the same to a temperature above 50° C. and a pressure above 60 pounds per square inch and to the action of a liquid containing an active solvent in a proportion of 35 to 45% and a precipitating liquid in a proportion of 65 to 55%, quickly releasing the pressure to form a porous mass and then grinding the porous cellulose acetate into particle size.

GEORGE SCHNEIDER.